US007587349B2

(12) United States Patent
Gottlieb et al.

(10) Patent No.: US 7,587,349 B2
(45) Date of Patent: Sep. 8, 2009

(54) METHOD, SYSTEM, AND COMPUTER PROGRAM PRODUCT FOR CARD SELECTOR TOOL

(75) Inventors: Jill E. Gottlieb, Lawrenceville, NJ (US); Rene Jesus Villegas, Brooklyn, NY (US); Lincoln T. Bjorkman, Westport, CT (US); Eunice E. Chase, Brooklyn, NY (US); Min S. Chung, New York, NY (US); Brendan M. Gallagher, Narberth, PA (US); Whitney G. Hess, New York, NY (US); Nori S. Kaiser, New York, NY (US); Nicholas E. Kierstead, New York, NY (US); Richard LaFauci, New York, NY (US); Judith Laughren, New York, NY (US); Grace Cham Perez, Edgewater, NJ (US); John A. Young, West Chester, PA (US)

(73) Assignee: American Express Travel Related Services Company, Inc., New York, NY (US)

( * ) Notice: Subject to any disclaimer, the term of this patent is extended or adjusted under 35 U.S.C. 154(b) by 58 days.

(21) Appl. No.: 11/673,385

(22) Filed: Feb. 9, 2007

(65) Prior Publication Data
US 2008/0021814 A1      Jan. 24, 2008

Related U.S. Application Data

(60) Provisional application No. 60/771,871, filed on Feb. 10, 2006.

(51) Int. Cl.
*G06Q 40/00* (2006.01)

(52) U.S. Cl. .......................................... 705/35; 705/37
(58) Field of Classification Search .............. 705/10–44
See application file for complete search history.

(56) References Cited

U.S. PATENT DOCUMENTS

| 5,705,798 | A | * | 1/1998 | Tarbox ...................... 235/379 |
| 6,018,718 | A | * | 1/2000 | Walker et al. ................ 705/14 |
| 6,135,349 | A | * | 10/2000 | Zirkel ....................... 235/375 |
| 6,144,948 | A | * | 11/2000 | Walker et al. ................ 705/38 |
| 6,636,833 | B1 | * | 10/2003 | Flitcroft et al. ............... 705/1 |
| 6,718,314 | B2 | * | 4/2004 | Chaum et al. ................ 705/64 |
| 6,817,521 | B1 | * | 11/2004 | Matada ..................... 235/380 |
| 2002/0178113 | A1 | * | 11/2002 | Clifford et al. .............. 705/39 |

OTHER PUBLICATIONS

Pick the bank card that's right for your needs: [Five Star Sports Final Edition], Chicago Sun-Times, Chicago, Ill.: Dec. 28, 1986, p. 1.*

* cited by examiner

*Primary Examiner*—Frantzy Poinvil
(74) *Attorney, Agent, or Firm*—Sterne, Kessler, Goldstein & Fox, P.L.L.C.

(57) ABSTRACT

A financial transaction instrument selector tool to help customers find a financial transaction instrument that is tailored to that customer's preferences. Preferences are input to a computer. Financial transaction instruments are selected to match the input preferences. The selected financial transaction instruments are then displayed for viewing. The preferences can be altered continuously. The effect of a change in at least one preference on the financial transaction instruments selected and displayed is updated in real-time. A double random sort technique may be used to determine the display order of financial transaction instruments that are selected.

18 Claims, 10 Drawing Sheets

Double Random Sorting

METHOD, SYSTEM, AND COMPUTER PROGRAM PRODUCT FOR CARD SELECTOR TOOL

CROSS REFERENCE TO RELATED APPLICATIONS

This application claims priority under 35 U.S.C. § 119(e) to U.S. Provisional Patent Application No. 60/771,871, filed Feb. 10, 2006, which is incorporated herein by reference in its entirety.

BACKGROUND OF THE INVENTION

1. Field of the Invention

The present invention generally relates to marketing and more particularly toward tailoring the offering of a financial transaction instrument to meet a specific customer's requirements.

2. Background Art

Currently, the marketing of financial transaction instruments via the internet is a hit or miss proposition when it comes to providing a customer with a financial transaction instrument that accurately suits the customer's needs. Current internet-based financial transaction instrument selector tools ask prospective customers a list of questions in a questionnaire form to determine the customer's preferences. A decision is made as to which cards to present to the prospective customer based on the customer's preferences. The results of the decision, that is, selected financial transaction instruments, are then displayed to the customer. If the customer desires to change their preferences, the customer must complete an entirely new questionnaire. This can be time-consuming and frustrating to the customers. Often, the financial transaction instruments displayed do not accurately meet the customer's preferences because the customer cannot easily adjust the preferences input to the questionnaire.

In addition, when cards meeting the customer's preferences are displayed, the financial transaction instruments are typically displayed in the order determined by the name of the issuers. Thus, the financial transaction instruments of some issuers are always displayed prior to the display of financial transaction instruments by other issuers. This results in a missed advertising and sales opportunity by the issuers whose cards are not displayed earlier and issuers who only offer a limited number of cards.

Thus, what is needed is a method and system that overcomes the shortcomings listed above.

BRIEF SUMMARY OF THE INVENTION

A dynamic financial transaction instrument selector tool can help customers find a financial transaction instrument that is tailored to that customer's preferences. Preferences are input to a computer via a web page. Financial transaction instruments are selected to accurately match the preferences. The selected financial transaction instruments are then displayed. The preferences can be altered continuously and the effect of a change in at least one preference on the financial transaction instruments selected and displayed is updated in real-time. A double random sort technique may be used to determine the display order of financial transaction instruments that are selected to accurately meet a specific group of preferences.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
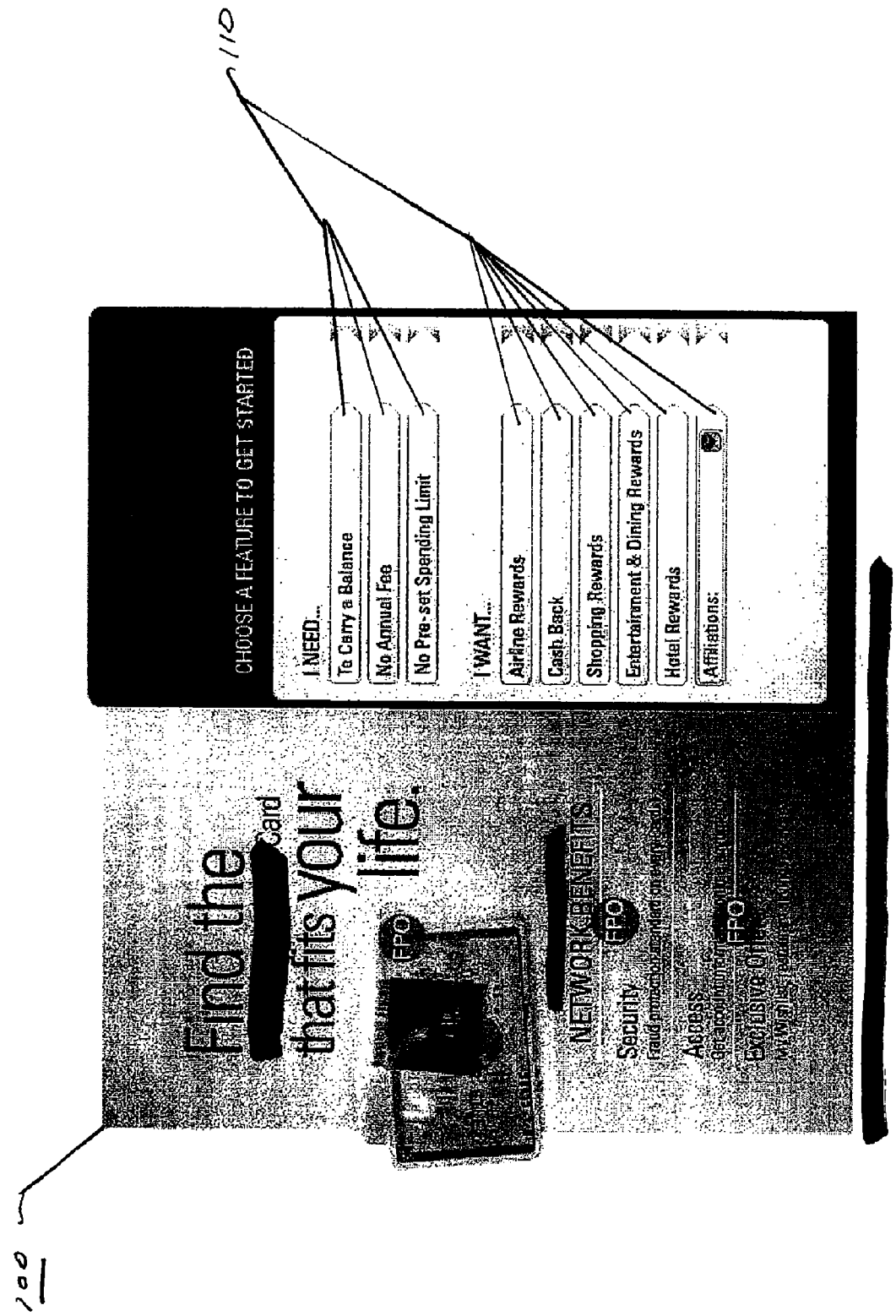
FIG. 1 is an exemplary window or screen shot generated by a graphical user interface of the tool showing an initial input screen for selecting customer preferences.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by, and/or benefiting from the tool that the present invention provides for selecting a preferred card.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards; titanium-containing or other metal-containing transaction cards; clear and/or translucent transaction cards; foldable or otherwise unconventionally-sized transaction cards; radio-frequency enabled transaction cards; or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

5. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. System

A financial transaction instrument selector tool can assist a user in selecting a card that is optimal for that user's preferences. The tool can dynamically update a display of qualified financial transaction instruments based on the user's selection or de-selection of one or more preferences; qualified financial transaction instruments are defined as a subset of the available financial transaction instruments including attributes that meet all of a given user's preferences and/or substantially meet a user's preferences (for example, a best possible match is made).

In one example embodiment, the customer preferences are readily accessible to the customer while the financial transaction instruments are displayed so that the user may simultaneously view both the selected user preferences and the financial transaction instruments. Any individual user preference can be changed at any time. The financial transaction instruments in the qualified set are selected, deselected, or reselected, when any single user preference is changed. The display of financial transaction instruments is updated substantially simultaneously with changes in user preferences. User research has shown that customers prefer having the ability to view a revised qualified set of financial transaction instruments contemporaneous with a change in customer preferences input to a card selector tool.

The financial transaction instruments in the qualified set are selected based upon matching the user preferences with a list of attributes for each financial transaction instrument. This process takes place to accurately match the displayed cards with the customer's needs and desires. An accurate match ensures that the customer is presented with a selection of financial transaction instruments that are best suited to the customer's needs and desires.

FIG. 1 is an exemplary window or screen shot 100 generated by a graphical user interface of a tool for assisting users in selecting a particular financial transaction instrument. Window or screen shot 100 shows an initial input screen for selecting user preferences 110.

In one example embodiment of the invention, if no user preferences are entered, the graphical user interface or web screen displays no financial transaction instruments.

User preferences are divided roughly into two subgroups: personal financial transaction instruments and multi-user financial transaction instruments; that is, financial transaction instruments for businesses and organizations. User preferences in each of these two categories are tailored to the expected requirements of the customer.

Preferences for the personal financial transaction instruments include, for example and without limitation, the following: preference to carry a balance forward, preference to have no annual fee, preference to have an unlimited line of credit, preference to obtain airline rewards, preference to obtain cash back rewards, preference to obtain shopping rewards, preference to obtain entertainment rewards, preference to obtain dining rewards, preference to obtain gas and automotive rewards, preference to obtain hotel rewards, or preference to obtain a financial transaction instrument that is affiliated with a third party organization.

Preferences for the multi-user financial transaction instruments include, for example and without limitation the following: preference for an extended warranty, preference for high-priority dispute resolution, preference for purchase insurance, preference for hotel burglary insurance, preference for rental car insurance coverage, preference for travel assistance insurance, preference for trip cancellation insurance, preference for concierge service, preference for accidental death and dismemberment insurance, preference for identity theft insurance, preference to capture extensive data about purchases at the point of sale, preference to consolidate expenditures within a single payment program, preference to retrieve detailed, industry standard information, preference to assign cards to individuals or departments with variable controls, preference to enable a user to retrieve purchasing information daily, weekly, or monthly, preference to enable a user to create reports to manage an organization and control expenses, preference to set variable spending controls on one or more of purchase amount, number of transactions, and types of suppliers, preference to change purchasing authorization and spending criteria across an entire business platform, preference to manage information with one central data repository, or preference to customize reporting for spending and planning practices.

Although some preferences are described herein as preferences for personal financial transaction instruments, one of skill in the art will recognize that the preferences may also be incorporated with multi-user financial transaction instruments. Similarly, although some preferences are described herein as preferences for multi-user financial transaction instruments, one of skill in the art will recognize that the preferences may also be incorporated with personal financial transaction instruments.

Figure 2:
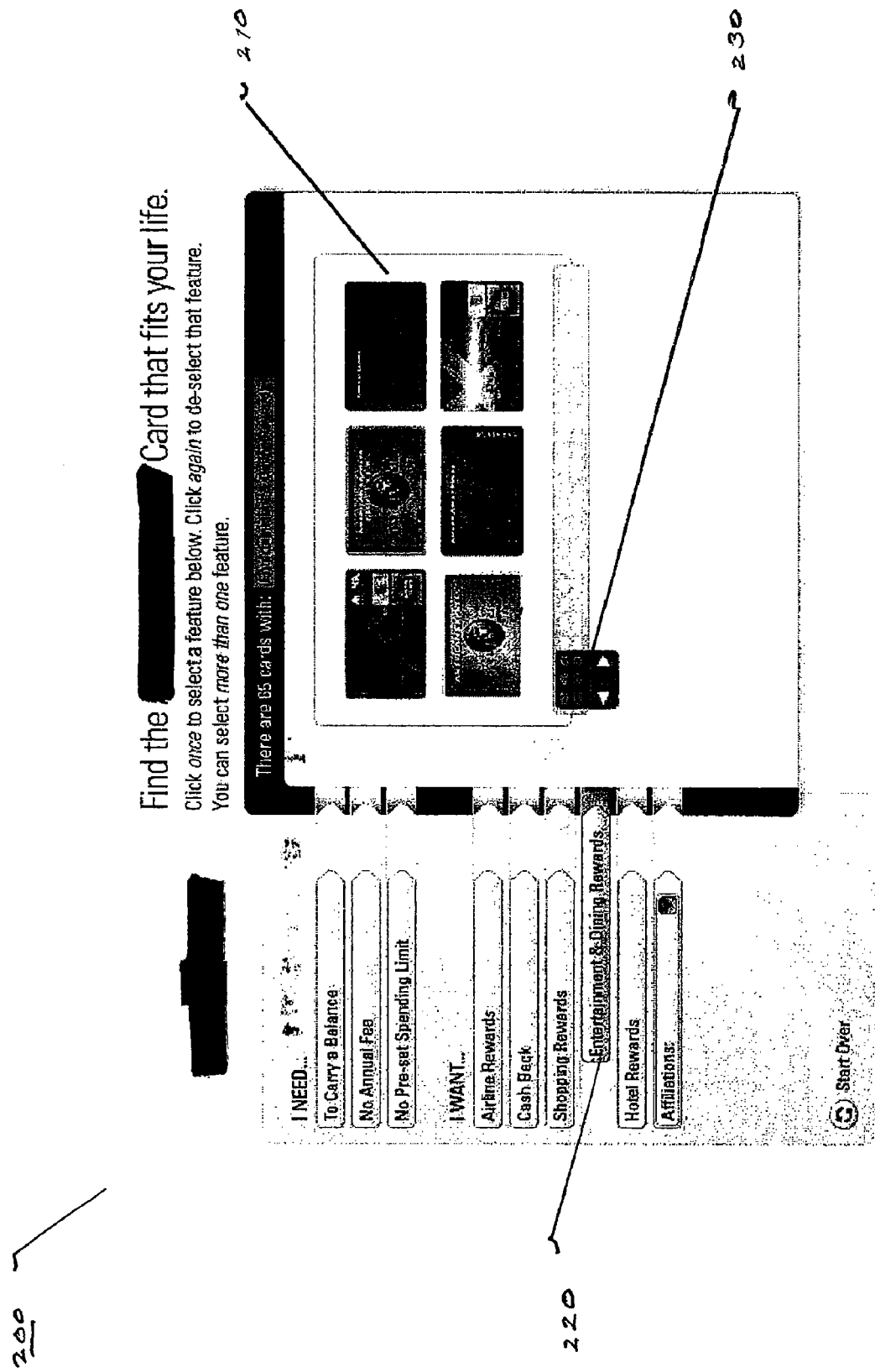
FIG. 2 is an exemplary window or screen shot generated by the graphical user interface of the tool showing a display of examples of qualified cards based on selection of a single preference.

FIG. 2 is an exemplary window or screen shot 200 generated by the graphical user interface of the tool showing a display of examples of qualified financial transaction instruments 210 based on selection of a single preference 220.

In one example embodiment of the invention, the graphical user interface or web screen has a sliding icon 230 to allow a person using the graphical user interface or web screen to select a group of cards for display.

Figure 3:
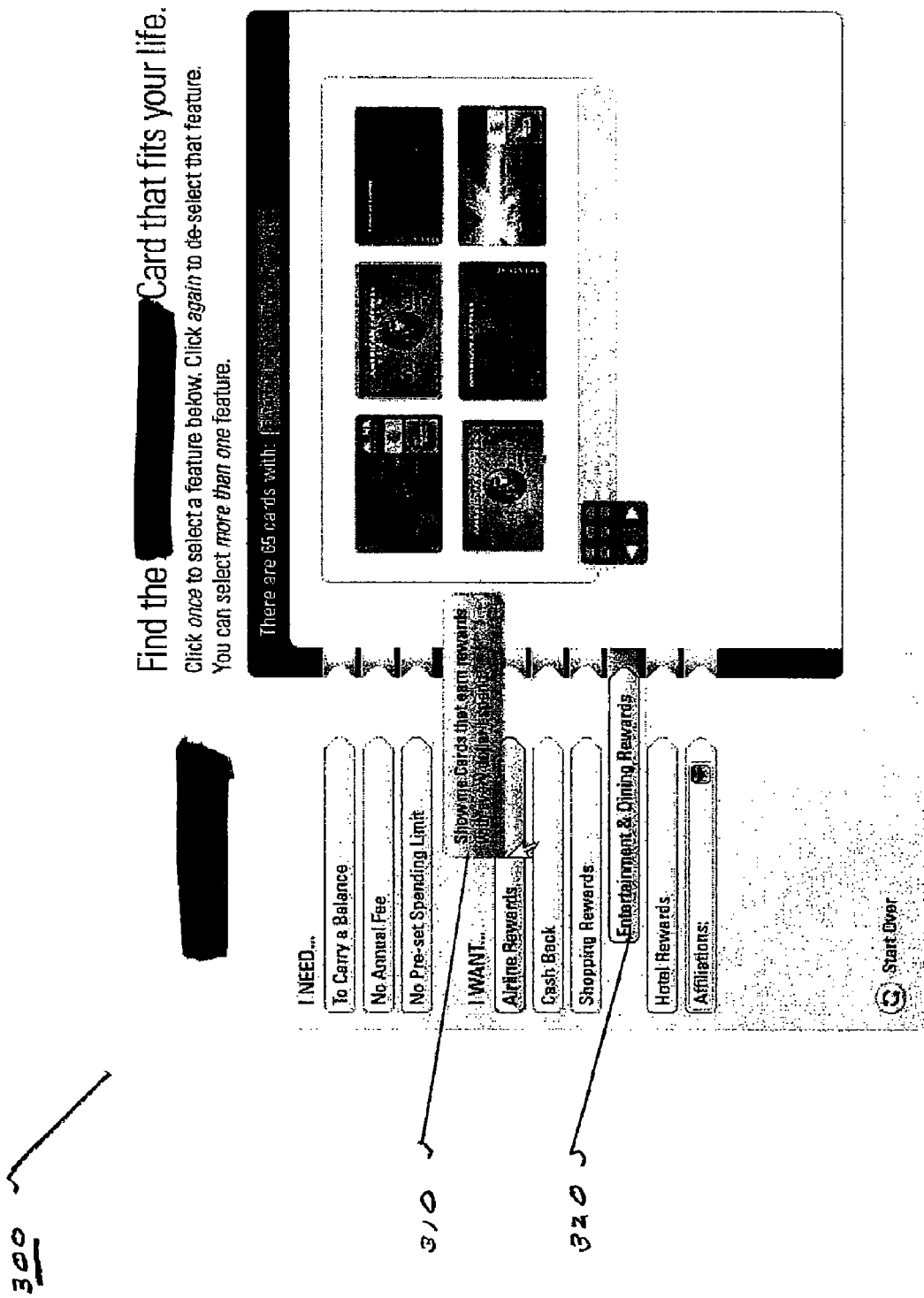
FIG. 3 is an exemplary window or screen shot generated by the graphical user interface of the tool showing a definition of a customer preference.

FIG. 3 is an exemplary window or screen shot 300 generated by the graphical user interface of the tool showing a definition 310 of a user preference, for the highlighted customer preference 320. Definition 310 provides further information about customer preference 320.

Figure 4:
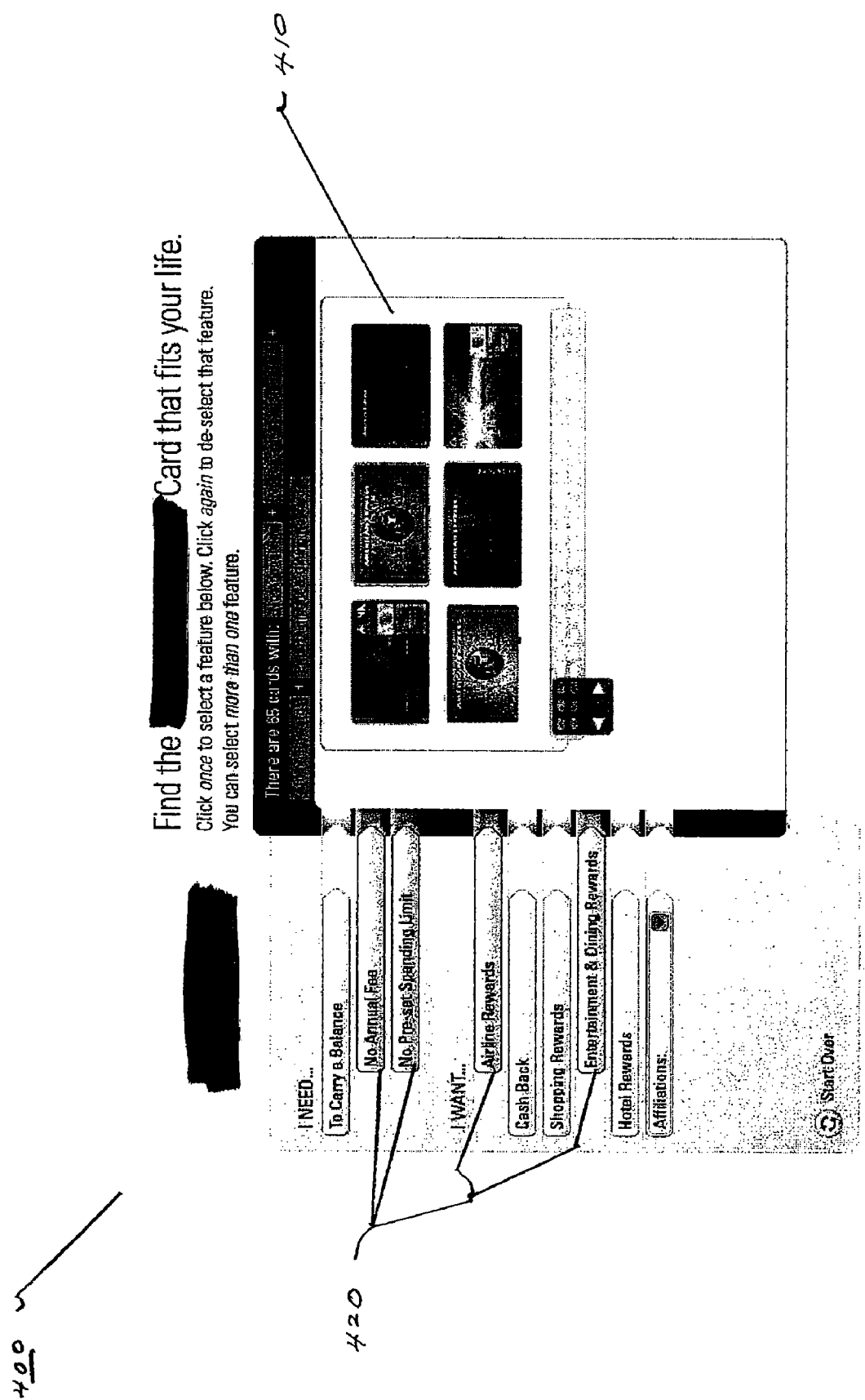
FIG. 4 is an exemplary window or screen shot generated by the graphical user interface of the tool showing a display of examples of qualified cards based on selection of multiple preferences.

FIG. 4 is an exemplary window or screen shot 400 generated by the graphical user interface of the tool showing a display of examples of qualified financial transaction instruments 410 based on selection of multiple preferences 420. The window dynamically updates based on preference selections and de-selections, so that selections and de-selections are quickly reflected in the qualified financial transaction instruments 410 displayed that meet the requirements of the new preferences. Dynamically updating the qualified financial transaction instrument window eliminates the need to start the selection process from the beginning for each new set of preferences. Methods of implementing dynamic update into an online tool are well known to those of skill in the art, and are thus not further described herein.

Figure 5:
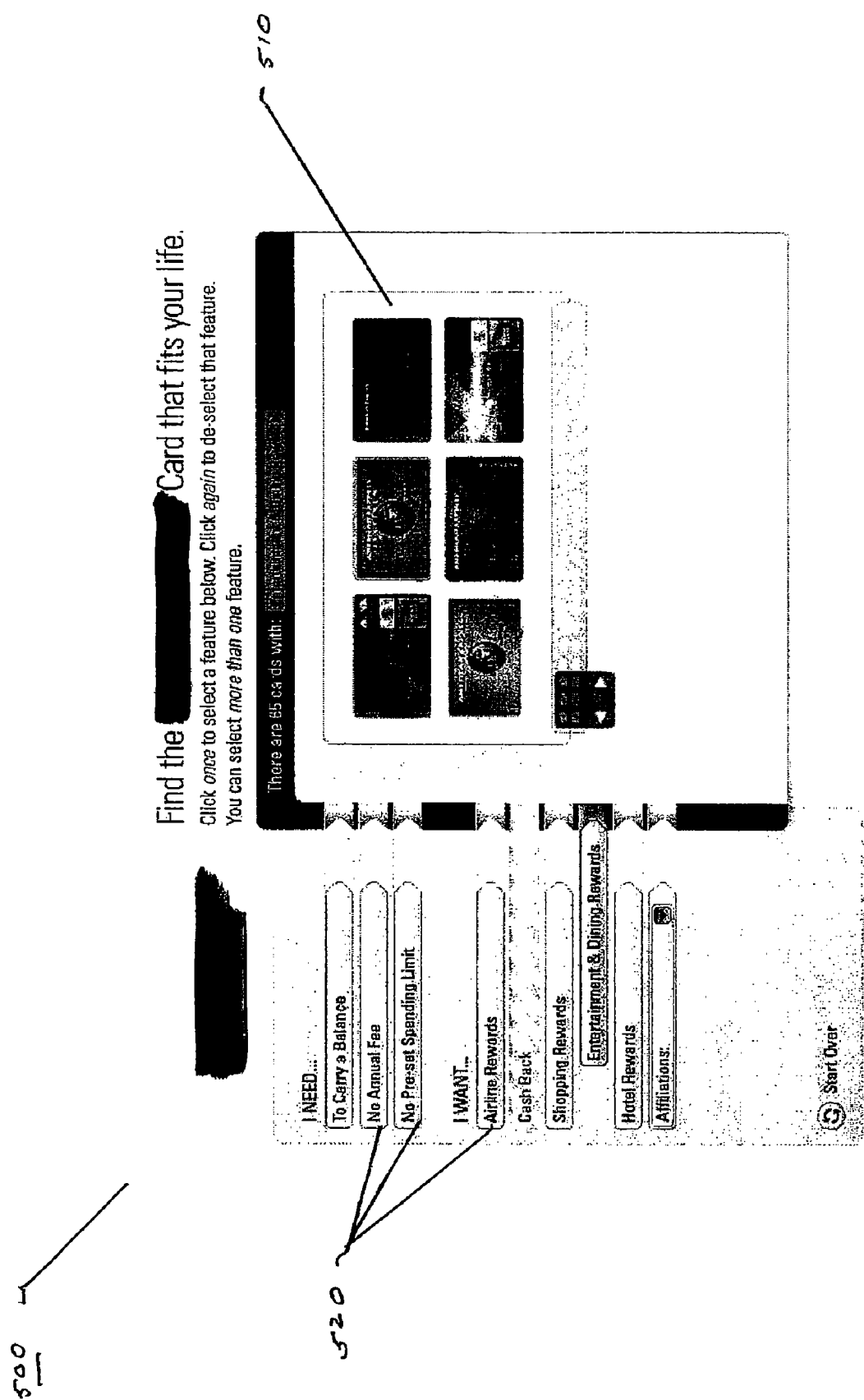
FIG. 5 is an exemplary window or screen shot generated by the graphical user interface of the tool showing a display of examples of qualified cards based on de-selection of multiple preferences.

FIG. 5 is an exemplary window or screen shot 500 generated by the graphical user interface of the tool showing a display of examples of qualified financial transaction instruments 510 based on de-selection of multiple preferences 520; preferences 520 had previously been selected as a subset of preferences 420 in exemplary window or screen shot 400.

Figure 6:
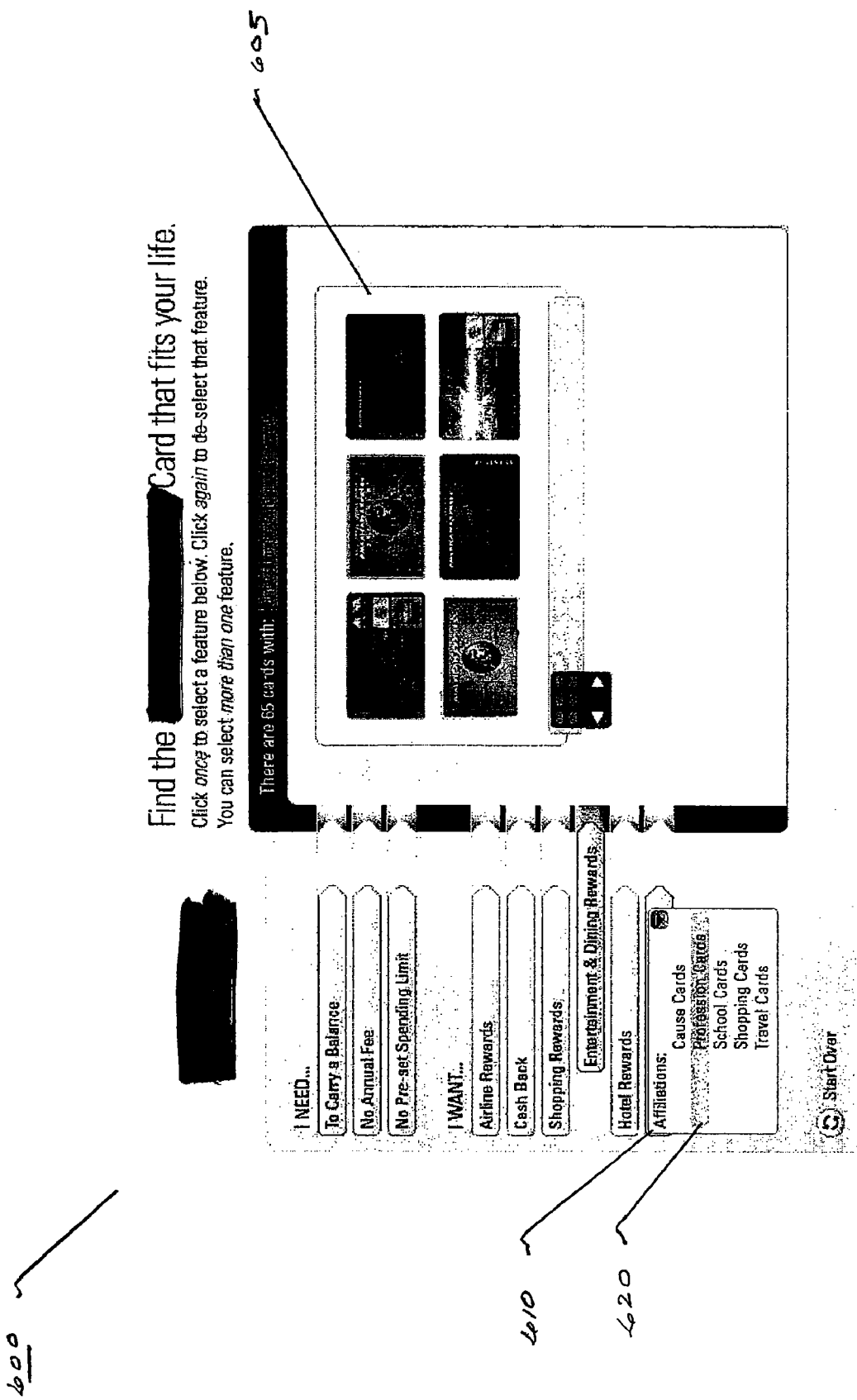
FIG. 6 is an exemplary window or screen shot generated by the graphical user interface of the tool showing a display of a drop-down box to provide a means to further narrow preferences.

FIG. 6 is an exemplary window or screen shot 600 generated by the graphical user interface of the tool showing a display of a drop-down box 610 to provide a means to further narrow the display of qualified financial transaction instruments 605 using preferences 620. Upon selection of one or more preferences 620, display 605 dynamically updates to reflect the selection.

Figure 7:
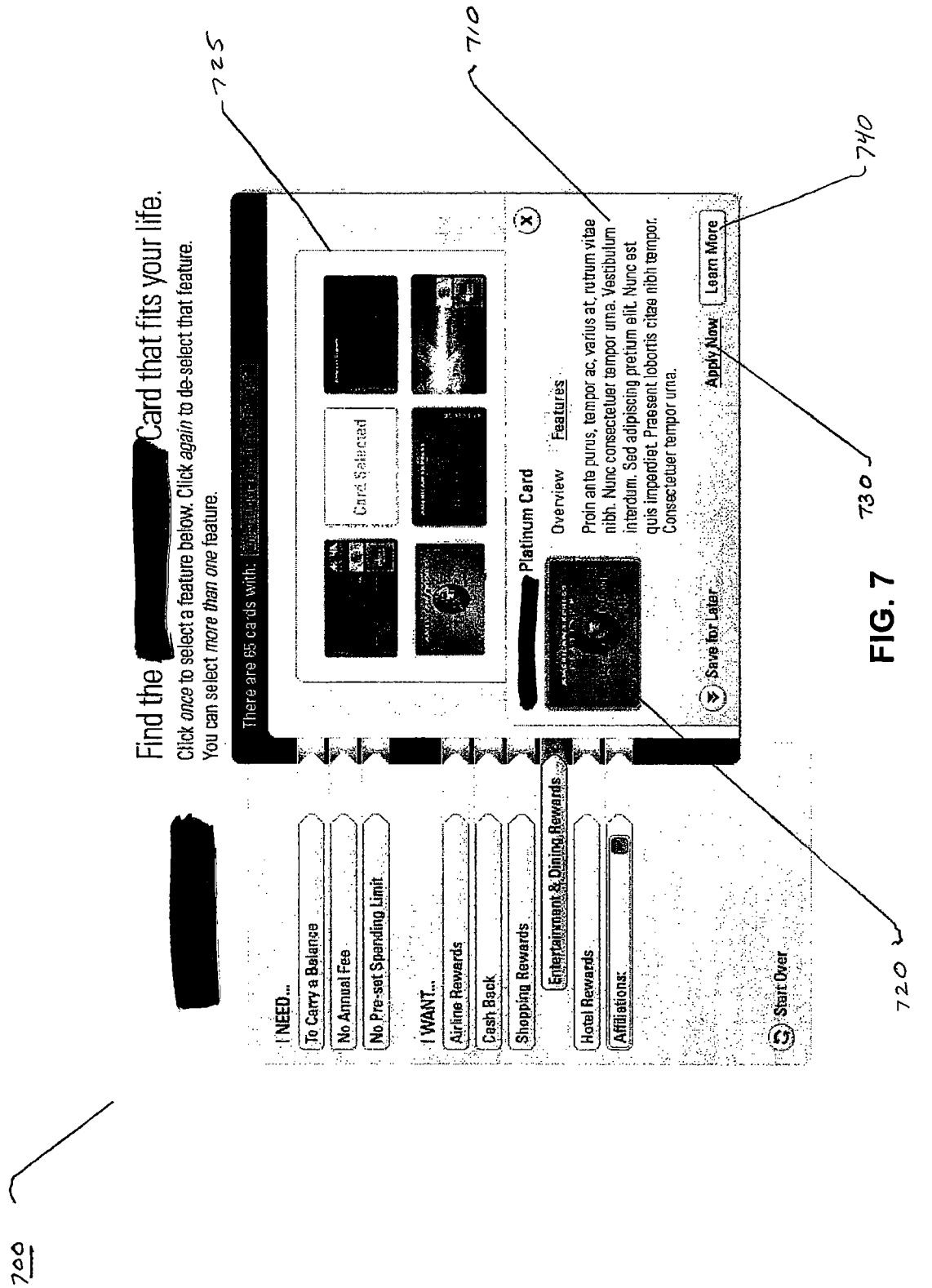
FIG. 7 is an exemplary window or screen shot generated by the graphical user interface of the tool showing a display of detailed information about one of the examples of qualified cards.

FIG. 7 is an exemplary window or screen shot 700 generated by the graphical user interface of the tool showing a display of detailed information 710 about an example financial transaction instrument 720 from the display of qualified financial transaction instruments 725. In one embodiment, a means is provided to obtain information 710 about the displayed financial transaction instrument 720 by clicking on the displayed financial transaction instrument in display 725.

An application for a displayed financial transaction instrument 720 may also be accepted using the tool. The application may include, for example, enrollment and/or verification forms. A means 730 to refer a customer to a graphical user interface, web screen, phone number, mail address, or other contact method may be provided so that the customer may apply for the financial transaction instrument.

Figure 8:
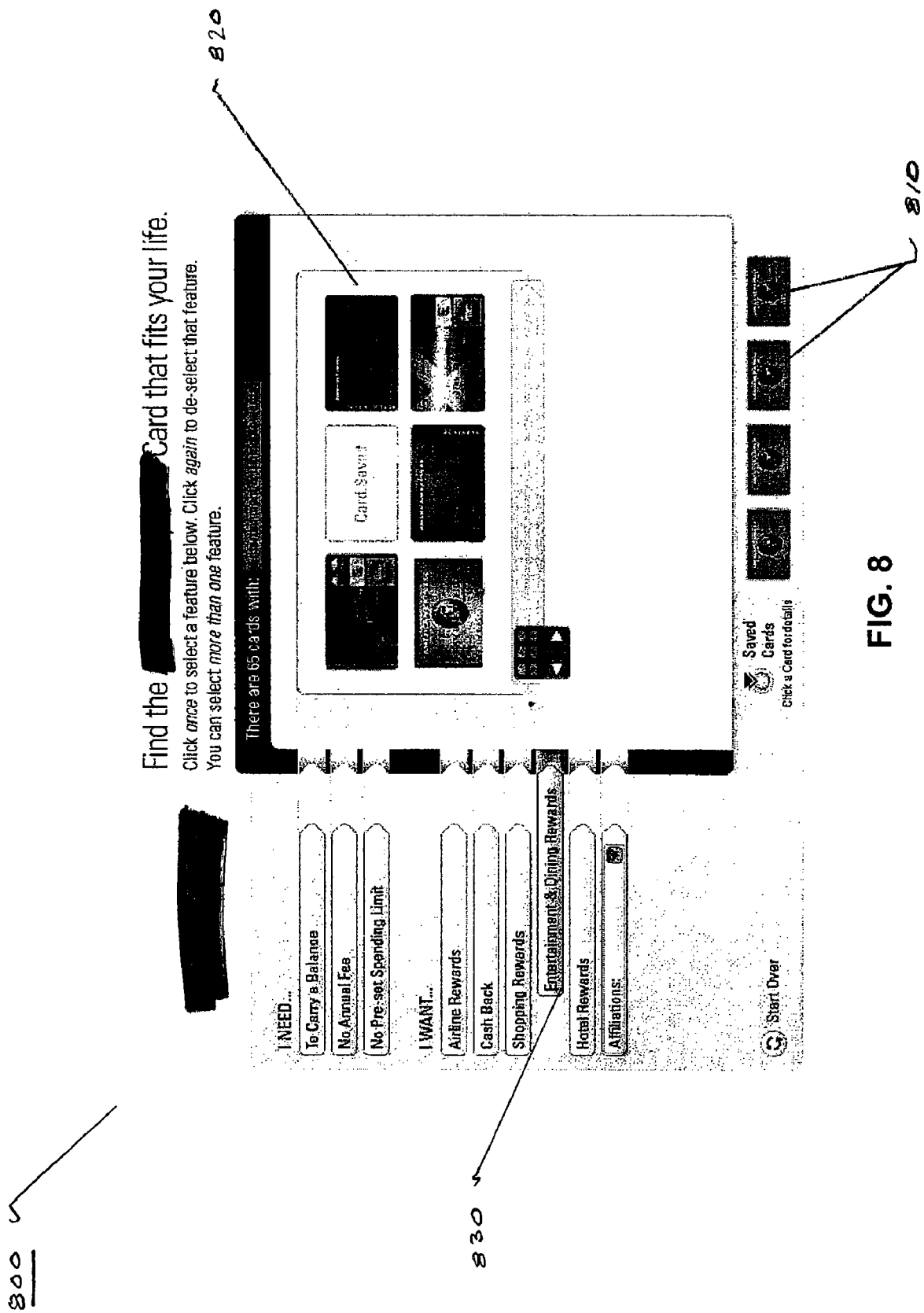
FIG. 8 is an exemplary window or screen shot generated by the graphical user interface of the tool showing a display of cards that have been identified as saved.

The tool may provide a means to save information about financial transaction instruments that the user is interested in so that the user can return to the financial transaction instrument at a later time. FIG. 8 is an exemplary window or screen shot 800 generated by the graphical user interface of the tool showing a display of cards 810 that have been identified as saved. In an embodiment, a means is provided to store a user's preferences 830 for future recall. In another embodiment, a means is provided to allow a customer to select multiple financial transaction instruments 820 for comparison of attributes. The comparison may be, for example, an item-by-item comparison of the attributes. The attributes may be a standard list of attributes, or may be a specific set of attributes selected by the user. In another embodiment, a means is provided to allow a customer to deselect financial transaction instruments 820 to remove them from a comparison of attributes. In another embodiment, a means is provided to store a customer's selected financial transaction instruments 810 for future recall. In another embodiment, a means is provided to delete a customer's selected financial transaction instruments from the saved financial transaction instruments 810 so they are not available for future recall.

The financial transaction instruments in the pool of available financial transaction instruments are not limited to a single issuer. Multiple card issuing entities can display their financial transaction instruments via the interface as will be further described with respect to process 1000 below.

The tool may gather user data and statistics including the number of clicks on each individual card preference, the number of times each individual financial transaction instrument is displayed, and the number of clicks on each individual financial transaction instrument displayed. Data collected may also include the total number of times each individual qualified financial transaction instrument is selected for an item-by-item attribute comparison with at least one other qualified financial transaction instrument. Data collected may also include the total number of customer clicks and page views on a "learn more" button, such as link 740 in FIG. 7. Data collected may also include the total number of customer clicks and page views on an "apply" button, such as link 730 in FIG. 7.

The tool may be scalable to add or remove financial transaction instruments from the pool as necessary. The tool may also be updateable to accommodate changes in financial transaction instrument attributes, designs, shapes, format, issuing entities. The tool can be implemented, updated, and/ or managed by card-issuing entity, a marketing company, a merchant network administrator, a computer programmer, a technician, and/or another competent party.

III. Process

Figure 10:
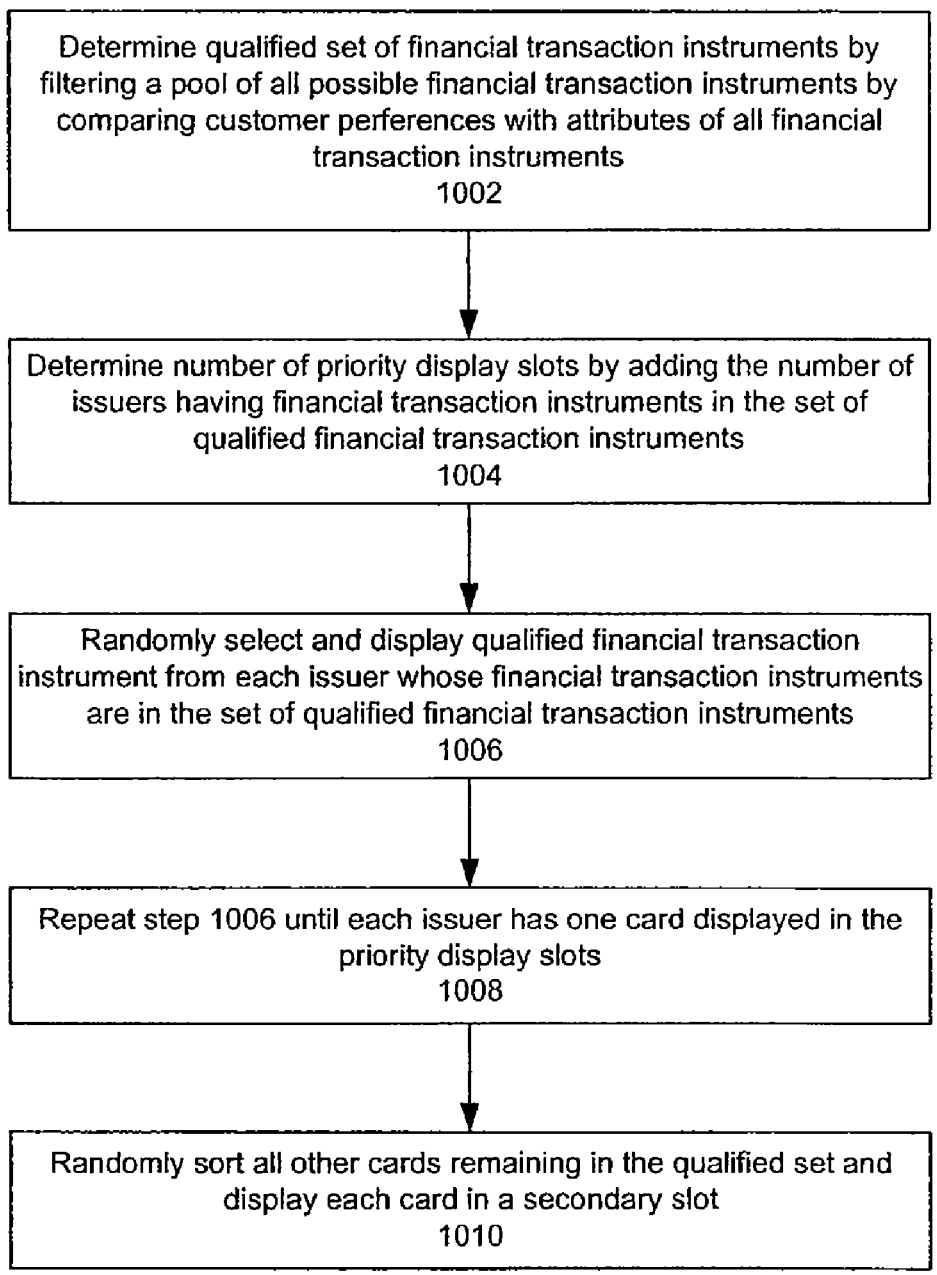
FIG. 10 is an exemplary flowchart showing double random sorting.

FIG. 10 is an exemplary flowchart showing a process 1000 for double random sorting of a set of qualified financial transaction instruments for display in a tool according to an embodiment of the present invention. At step 1002, user preferences are compared with attributes of all financial transaction instruments in a pool to determine a qualified set of financial transaction instruments.

At step 1004, the number of priority display positions is determined by adding or otherwise calculating the number of issuers having financial transaction instruments in the set of qualified financial transaction instruments.

At step 1006, one financial transaction instrument from each issuer whose financial transaction instruments are in the set of qualified financial transaction instruments is randomly selected and displayed in a priority position. The priority position is a location for qualified financial transaction instruments that are displayed to a user prior to display of qualified financial transaction instruments in a secondary position. Each financial transaction instrument issuer is limited to one financial transaction instrument to be displayed in a priority position. No financial transaction instrument issuer is typically given priority over other financial transaction instrument issuers in the display of financial transaction instruments in a priority position.

At step 1008, step 1006 is repeated until each financial transaction instrument issuer with a qualified financial transaction instrument has one financial transaction instrument from the qualified set displayed in a priority position.

At step 1010, the remaining qualified financial transaction instruments not already displayed in a priority position are randomly sorted and displayed in secondary positions.

The double random sorting of process 1000 ensures that, within a multi-issuer environment, each card-issuing entity issuing a financial transaction instrument in the qualified set has an equal opportunity to have one of their financial transaction instruments displayed to a prospective customer in a priority position.

IV. Example Implementations

The present invention (including and not limited to the exemplary systems in FIGS. 1-8 or the exemplary process in FIG. 10 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 9:
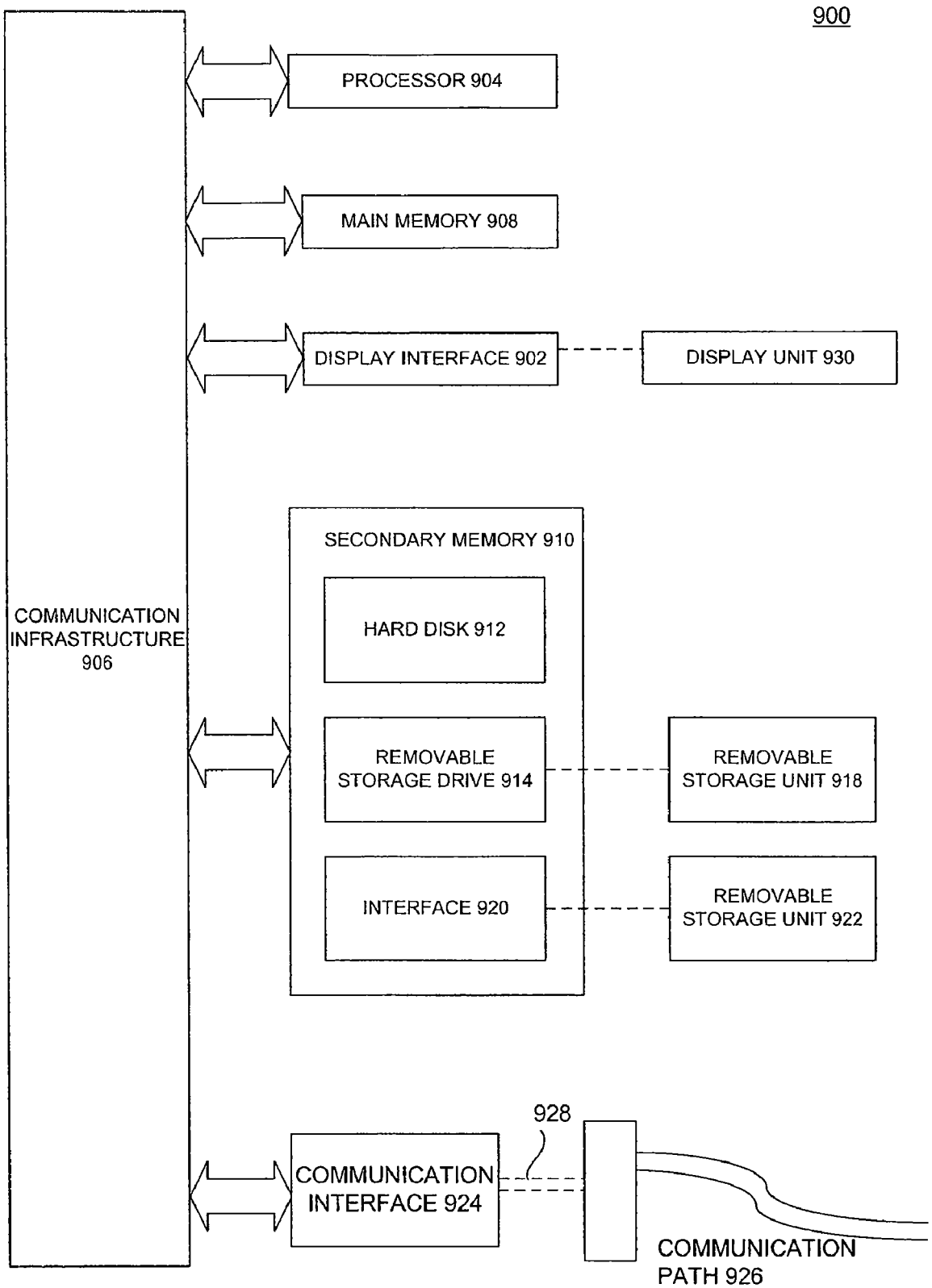
FIG. 9 is a block diagram of an exemplary computer system useful for implementing the present invention.

In fact, in one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method for displaying a qualified set of financial transaction instruments, said method being executed by a computer system and comprising:

electrically comparing, using the computer system, a customer preference with an attribute of a first set of financial transaction instruments to determine a qualified set of financial transaction instruments;

electrically determining, using the computer system, a number of priority display positions by calculating a number of unique financial transaction instrument issuers having financial transaction instruments in the qualified set of financial transaction instruments;

electrically randomly selecting and displaying in one of the priority display positions, a qualified financial transaction instrument from each unique financial transaction instrument issuer, wherein the qualified financial transaction instrument is in the qualified set of financial transaction instruments; and electrically randomly selecting and displaying in a secondary display position all financial transaction instruments in the qualified set of financial transaction instruments except those qualified financial transaction instruments displayed in a priority display position.

2. The method of claim 1, further comprising:

listing an item-by-item comparison of the attributes of multiple financial transaction instruments from the set of qualified transaction instruments displayed, wherein the attributes are selected by a customer;

displaying detailed attributes of a customer-selected financial transaction instrument from the set of qualified transaction instruments; and displaying enrollment and verification forms for the customer-selected financial transaction instrument from the set of qualified transaction instruments.

3. The method of claim 1, wherein the customer preference is at least one of:
- a preference to carry a balance;
- a preference to have an annual fee of zero dollars;
- a preference to have no preset spending limit;
- a preference to obtain airline rewards;
- a preference to obtain cash back rewards;
- a preference to obtain shopping rewards;
- a preference to obtain entertainment rewards;
- a preference to obtain dining rewards;
- a preference to obtain gas and automotive rewards;
- a preference to obtain hotel rewards; or
- a preference to obtain a financial transaction instrument that is affiliated with a third party organization.

4. The method of claim 1, wherein the customer preference is at least one of:
- a preference for an extended warranty;
- a preference for high-priority dispute resolution;
- a preference for purchase insurance;
- a preference for hotel burglary insurance;
- a preference for rental car insurance coverage;
- a preference for travel assistance insurance;
- a preference for trip cancellation insurance;
- a preference for concierge service;
- a preference for accidental death and dismemberment insurance;
- a preference for identity theft insurance;
- a preference to capture extensive data about purchases at the point of sale;
- a preference to consolidate expenditures within a single payment program;
- a preference to retrieve detailed, industry standard information;
- a preference to assign cards to individuals or departments with variable controls;
- a preference to enable a user to retrieve purchasing information daily, weekly, or monthly;
- a preference to enable a user to create reports to manage an organization and control expenses;
- a preference to set variable spending controls on one or more of purchase amount, number of transactions, and types of suppliers;
- a preference to change purchasing authorization and spending criteria across an entire business platform;
- a preference to manage information with one central data repository; or
- a preference to customize reporting for spending and planning practices.

5. The method of claim 1, further comprising:
processing, ranking, and storing selections of customers.

6. The method of claim 5, wherein processing, ranking, and storing selections of customers comprises:
ranking attribute preferences by number of times displayed following selection by customer.

7. The method of claim 5, wherein processing, ranking, and storing selections of customers comprises:
ranking financial transaction instruments by number of times displayed following random selection and display of qualified financial transaction instruments.

8. The method of claim 5, wherein processing, ranking, and storing selections of customers comprises:
ranking financial transaction instruments by number of times displayed following selection from the set of qualified financial transaction instruments for an item-by-item attribute comparison with at least one other financial transaction instrument from the set of qualified financial transaction instruments.

9. The method of claim 5, wherein processing, ranking, and storing selections of customers comprises:
ranking financial transaction instruments by number of times displayed following selection for detailed attributes from the set of qualified financial transaction instruments.

10. The method of claim 5, wherein processing, ranking, and storing selections of customers comprises:
ranking financial transaction instruments by number of times displayed following selection for enrollment and verification forms from the set of qualified transaction instruments.

11. A system for processing rewards for a customer using a transaction account, comprising:
a processor; and
a memory in communication with the processor, the memory for storing a plurality of processing instructions for directing the processor to:
  compare a customer preference with an attribute of a first set of financial transaction instruments to determine a qualified set of financial transaction instruments;
  determine a number of priority display positions by calculating a number of unique financial transaction instrument issuers having financial transaction instruments in the qualified set of financial transaction instruments;
  randomly select and display in one of the priority display positions, a qualified financial transaction instrument from each unique financial transaction instrument issuer, wherein the qualified financial transaction instrument is in the qualified set of financial transaction instruments; and
  randomly select and display in a secondary display position all financial transaction instruments in the qualified set of financial transaction instruments except those qualified financial transaction instruments displayed in a priority display position.

12. The system of claim 11, wherein the plurality of processing instructions further comprises instructions for directing the processor to:
list an item-by-item comparison of the attributes of multiple financial transaction instruments from the set of qualified transaction instruments displayed, wherein the attributes are selected by a customer;
display detailed attributes of a customer-selected financial transaction instrument from the set of qualified transaction instruments; and
display enrollment and verification forms for the customer-selected financial transaction instrument from the set of qualified transaction instruments.

13. The system of claim 12, wherein the plurality of processing instructions further comprises instructions for directing the processor to:
process, rank, and store customer preferences.

14. The system of claim 13, wherein the instructions for directing the processor to process, rank, and store comprise instructions for directing the processor to:
process, rank, and store attribute preferences of customers.

15. The system of claim 13, wherein the instructions for directing the processor to process, rank, and store comprise instructions for directing the processor to:
process, rank, and store financial transaction instruments, wherein the financial transaction instruments are ranked by number of times displayed following random selection and display of qualified transaction instruments.

16. The system of claim 13, wherein the instructions for directing the processor to process, rank, and store comprise instructions for directing the processor to:

process, rank, and store financial transaction instruments, wherein the financial transaction instruments are ranked by number of times displayed following selection from the set of qualified transaction instruments for an item-by-item attribute comparison with at least one other financial transaction instrument from the set of qualified transaction instruments.

17. The system of claim 13, wherein the instructions for directing the processor to process, rank, and store comprise instructions for directing the processor to:

process, rank, and store financial transaction instruments, wherein the financial transaction instruments are ranked by number of times displayed following selection for detailed attributes from the set of qualified transaction instruments.

18. The system of claim 13, wherein the instructions for directing the processor to process, rank, and store comprise instructions for directing the processor to:

process, rank, and store financial transaction instruments, wherein the financial transaction instruments are ranked by number of times displayed following selection for enrollment and verification forms from the set of qualified transaction instruments.

* * * * *